United States Patent [19]

Richard et al.

[11] Patent Number: 5,369,415
[45] Date of Patent: Nov. 29, 1994

[54] DIRECT RETINAL SCAN DISPLAY WITH PLANAR IMAGER

[75] Inventors: Fred V. Richard, Scottsdale; Michael S. Lebby, Chandler, both of Ariz.

[73] Assignee: Motorola, Inc., Schaumburg, Ill.

[21] Appl. No.: 889,582

[22] Filed: Jun. 29, 1992

[51] Int. Cl.$^5$ .............................................. G09G 3/02
[52] U.S. Cl. ........................................... 345/6; 345/7; 359/630
[58] Field of Search ....................................... 345/5-9; 359/630; 348/51

[56] References Cited

U.S. PATENT DOCUMENTS

| | | | |
|---|---|---|---|
| 4,349,815 | 9/1982 | Spooner | 340/705 |
| 4,711,512 | 12/1987 | Upatnieks | 340/705 |
| 4,794,430 | 12/1988 | Whittaker et al. | 340/705 |
| 4,869,575 | 9/1989 | Kubik | 340/705 |

OTHER PUBLICATIONS

Stephenson, D., et al, A helmet-mounted sight system, GEC Journal of Science and Technology, vol. 46, No. 1, 1980, pp. 33–38.

Primary Examiner—Ulysses Weldon
Attorney, Agent, or Firm—Eugene A. Parsons

[57] ABSTRACT

A display which writes an image directly on the retina of an eye. The display includes a laser which produces a collimated light beam that is modulated with video information and is then scanned and directed through the eye pupil to produce an image on the retina. The scanning uses micro-machined mirrors, electro-optic or acousto-optic devices which are extremely small and require very low power.

14 Claims, 2 Drawing Sheets

DIRECT RETINAL SCAN DISPLAY WITH PLANAR IMAGER

The present invention pertains to optical displays and more specifically to an optical display with a planar imager for direct writing onto a retina.

BACKGROUND OF THE INVENTION

Generally, optical displays are relatively large and complicated as evidenced, for example, by television and computer displays. Even when relatively small virtual display devices, such as disclosed in a copending patent application entitled "Compact Virtual Image Display", Ser. No. 07/767,179, filed Sep. 30, 1991, and assigned to the same assignee, are utilized, relatively high amounts of power are required. Generally this is caused by the fact that an incoherent image is produced and focused, by a plurality of lenses including the lens in the eye, onto the retina of the eye. Producing the incoherent image, whether it is real or virtual, requires substantial amounts of power and apparatus, which results in large and unwieldily structure.

In the prior art, a virtual image is produced by an array of light emitting diodes. The virtual image is then scanned by a mechanical mirror scanner with an image viewable by an operator being produced by imaging optics. This device is expensive, complicated to adjust and use, and is very sensitive to shock and other similar disturbances.

Direct retinal scanning devices have been devised, as for example the display disclosed in copending patent application entitled "Direct Retinal Scan Display", Ser. No. 07/857,193, filed Mar. 25, 1992, and assigned to the same assignee. In this device a scanning system is utilized in which light beams travel through the air and are scanned in a raster on the retina. Because of the distance travelled between the light source and the retina, relatively large scanning, or deflection, angles are required.

SUMMARY OF THE INVENTION

It is a purpose of the present invention to provide a new and improved direct retinal scan display.

It is a further purpose of the present invention to provide a new and improved direct retinal scan display which requires less complicated scanning equipment to produce an image in the eye.

The above problems are solved and purposes realized by utilizing a direct write planar imager including an input for receiving a collimated beam of light scanned in two orthogonal directions and intensity modulated, an output for directing the light beam into the eye of an operator and a redirection diffractive optical element for creating a virtual image on the retina of the eye.

The above problems are solved and purposes realized by a method of forming a direct retinal scan display including the steps of providing a directed beam of light, modulating the beam of light to impress video information onto the beam of light, deflecting the beam of light in two orthogonal directions, providing a planar imager including an input for receiving a beam of light, an output for directing the received beam of light into the eye of an operator which involves a redirection diffractive optical element for creating a virtual image from the beam of light on the retina of the eye, and directing the beam of light scanned in two orthogonal directions and modulated into the input of the planar imager and the output of the planar imager into the eye of an operator.

DESCRIPTION OF THE PREFERRED EMBODIMENT

Figure 1:
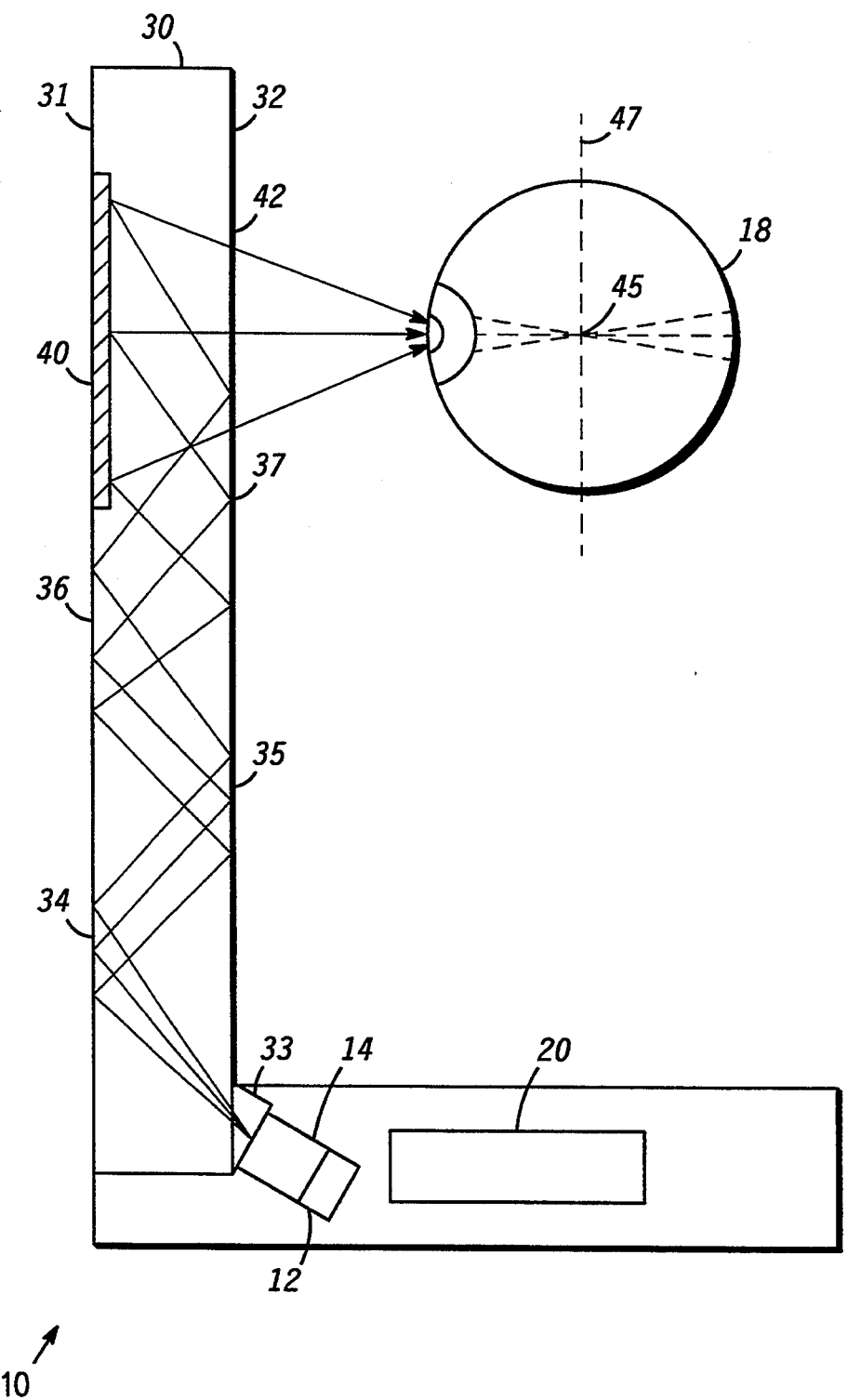
FIG. 1 is a view in top plan of a direct retinal scan display in accordance with the present invention and including an optical light ray diagram illustrating the operation of the display.

FIG. 1 is a view in top plan of a direct retinal scan display 10 in accordance with the present invention. A laser/modulator 12, which may include any of the well known lasers including solid state lasers, such as vertical cavity surface emitting lasers, diode lasers, diode-pumped lasers, etc., supplies a coherent, collimated light beam through a modulator, illustrated as a single unit in this embodiment. The modulator impresses video information onto the light beam generally by modulating the intensity of the light beam as, for example, by providing changes in the power level of the laser. Depending upon the application, the modulation could be as simple as varying the intensity of the laser, which essentially translates into an analog system. Acousto-optic modulators are one of the preferred modulators for most applications, but other techniques, such as electro-optics and mechanical are completely feasible.

It should be understood that laser/modulator 12 could include three lasers, red, green and blue, to create a color image. In the instance of color images, the modulator is somewhat more complicated but the basics and/or mechanics are well understood in the art and will not be detailed in this disclosure.

The modulated light beam from laser/modulator 12 is directed to a deflection system 14. The light beam is deflected, or scanned, in two orthogonal directions to produce a raster, in this embodiment. There are many possible configurations for deflection system 14, depending upon the application of the display and how it is desired to form the image in an eye 18. In this embodiment, deflection system 14 includes an acousto-optic horizontal scanner and an acousto-optic vertical scanner which in combination produce a moving spot of light. Acousto-optic components are small, solid state crystals which are used for deflecting laser beams and the like, as explained more fully in copending application Ser. No. '193 described above and included herein by reference.

While there are several possible techniques for scanning, or writing, an image on the retina, probably the simplest is to scan a complete raster (rectangularly shaped image area) on the retina at regular intervals. The regular intervals must be sufficiently fast so that it appears to the eye to be a continuous image, which means that a complete scan must be made approximately 60 times per second. To provide this raster, the horizontal scanner is controlled to scan the light beam, generally linearly, in a straight line at a first frequency. The vertical scanner is controlled to slowly scan the light beam in a direction orthogonal to the direction swept by the horizontal scanner. Thus, each time the horizontal scanner scans a complete line the vertical scanner moves the beam sufficiently so that the next scan is parallel with and adjacent the previous scan. In this way a complete raster is scanned periodically.

To produce an image, laser/modulator 12 must be controlled to vary the intensity of the light beam so that, as the light beam is swept through a complete raster, spots of different light intensity combine to form an image. Timing and control of laser/modulator 12 and deflection system 14 is provided by electronics 20. Electronics 20 includes a basic oscillator, or timer, which provides the timing signals to cause the sweeping and modulating to occur at the proper times. Also, electronics 20 provides video signals to laser/modulator 12 to modulate the light beam to the correct intensity at the required times. Further, electronics 20 provides horizontal and vertical (orthogonal) deflection signals to cause deflection system 14 to periodically scan the light beam in a raster. Depending upon the application and the desired image resolution, the horizontal deflection frequency may be on the order of 15 to 30 kHz., the vertical deflection is no lower than 60 Hz., and the modulating frequency may be on the order of 12 MHz.

Referring specifically to FIG. 1, an optical light ray diagram of the direct retinal scan display is illustrated. In this ray diagram it can be seen that a light beam from laser/modulator 12 is directed to a planar imager 30. In this embodiment, planar imager 30 is an elongated optical waveguide having opposed, spaced apart parallel sides 31 and 32. The term "waveguide" as used in this disclosure denotes total internal reflection confinement in a relatively thick substrate. This is opposed to the more conventional usage in which light is confined to a very thin layer in which only discrete waveguide modes can propagate. Planar imager 30 has a light inlet formed by an optical wedge 33 affixed thereto adjacent one end, which is constructed to present a substantially perpendicular surface to the light beam produced by laser/modulator 12 and deflection system 14. It will of course be understood that a perpendicular inlet could be formed by cutting the corner of planar imager 30, or in a variety of other methods.

Light rays from optical wedge 33 are directed along a light path through planar imager 30, and are reflected at predetermined areas 34, 35, 36 and 37, until the light rays impinge upon a diffractive optical element 40. Depending on the optical properties required of display 10 and planar imager 30, areas 34, 35, 36 and/or 37 may include additional diffractive optical elements, providing aberration correction, compensation for color dispersion in a color unit, etc. Side 32 defines an optical outlet 42, through which the reflected light beams emanate. Planar imager 30 provides angular magnification because of the length of the optical path therethrough. Because of this angular magnification, a very small change of angle at the inlet results in a relatively large scan at the surface of diffractive optical element 40. If it is desired to construct planar imager 30 even smaller, diffractive optical lenses can be used at any of the reflective areas 34, 35, 36 and/or 37.

Diffractive optical elements are any of the well known elements, similar in operation to a Fresnel lens, which are presently producible. As is known in the art, diffractive optical elements utilizing the Fresnel principal, binary optics, etc. are producible utilizing well known semiconductor manufacturing techniques. Such lenses are conveniently patterned to provide a desired function and may be attached to an outer surface of sides 31 and 32 or formed integrally therewith.

In this specific embodiment, diffractive optical element 40 is a redirection element which, when scanned by the light beam from optical wedge 33, redirects the light beam to create, in conjunction with the lens of eye 18, a virtual image on the retina of eye 18. Because of the angular magnification of planar imager 30, the virtual image created can be as wide as eye 18 can accept. In addition, the image created in eye 18 is relatively insensitive to movements of eye 18 by making a convergence point 45 of the rays emanating from diffractive optical element 40 through outlet 42 substantially at an axis of rotation 47 of eye 18. It should be noted that in this embodiment the laser power entering eye 18 is no stronger than approximately 20 microwatts.

Figure 2:
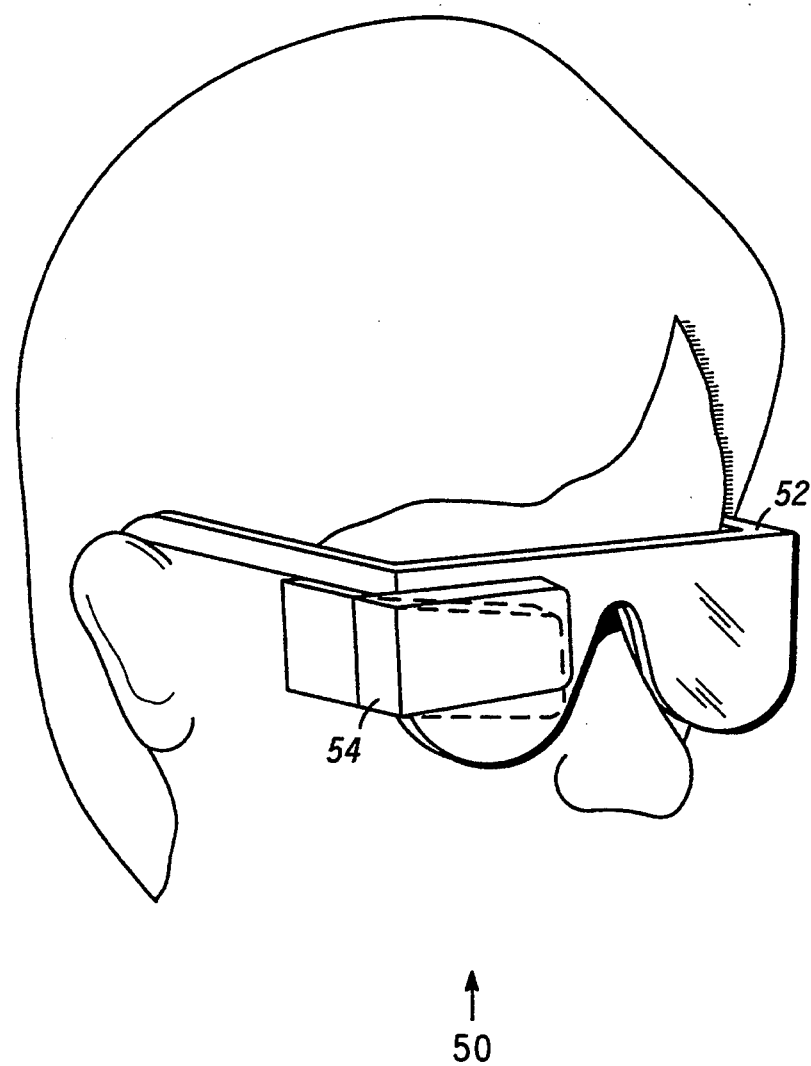
FIG. 2 is a perspective view of a head mounted direct retinal scan display as illustrated in FIG. 1.

Referring to FIG. 2, an embodiment of a head mounted retinal scan display 50 is illustrated. In this specific embodiment a frame 52 for eye glasses is utilized to mount direct retinal scan display 54 on the head of an operator. As will be apparent presently, frame 52 may contain standard eye glasses for ordinary use, in addition to being used for display 50, or may be utilized only for the purpose of display 50. A laser source and modulator may be contained in the illustrated portion of display 54 or in a separate portion (not shown) of display 50, which portion is carried in some convenient place on the body, such as a shirt pocket. If a separate portion is used, the separate portion produces a modulated beam of light which is carried by one or more light fibers through or along a temple of frame 52 to the illustrated portion 54 of display 50. In this specific embodiment, the portion 54 contains the entire direct retinal scan display (similar to that shown in FIG. 1) and is mounted on one temple of frame 52 so that the output beam of light is directed into the eye of the person wearing frame 52.

It should also be understood that the direct retinal display does not have to be head-mounted, but can be an embodiment where the display device is part of a hand-held unit, such as a pager, radio, phone, hand-held computer, wrist attached unit, or personal communicator. The user will position the hand-held device with the display in front of the eye for viewing. Also, the direct retinal scan display can be used in a binocular, panoramic, and/or stereo mode, where one display is used for each eye. The outside world view can either be blocked, so both eyes see only the image from the displays, or the display image can overwrite the outside world view, creating a composite image.

Thus, a new and improved direct retinal scan display is disclosed which utilizes a planar imager to substantially reduce the scanning angle required by the scanning system. Because the display requires a very small scanning angle, very low power is required and the size and complexity of the display is substantially reduced. Also, because of the extremely low power utilized, the display can be constructed very small and is, therefore, more convenient and useful than prior displays.

While we have shown and described specific embodiments of the present invention, further modifications and improvements will occur to those skilled in the art. We desire it to be understood, therefore, that this invention is not limited to the particular forms shown and we intend in the append claims to cover all modifications that do not depart from the spirit and scope of this invention.

What is claimed is:

1. A direct write planar imager including an inlet for receiving a collimated beam of light scanned in two orthogonal directions and intensity modulated, an outlet for directing the light beam into the eye of an operator and a redirection diffractive optical element for creating a virtual image only on the retina of the eye, the beam of light being directed from the inlet, along a path through the planar imager to the outlet, with the redirection diffractive optical element being positioned in the path, and the path from the inlet to the outlet providing angular magnification, whereby the scanning in two orthogonal directions required to write an image on the retina of the eye is substantially reduced because of the angular magnification in the planar imager.

2. A direct retinal scan display comprising:
   a light source for providing a directed beam of light, the light source including modulating means positioned to receive the beam of light for modulating video information onto the beam of light;
   deflection means positioned to receive the modulated beam of light and deflecting the beam of light in two orthogonal directions;
   a planar imager including an inlet for receiving the beam of light scanned in two orthogonal directions and modulated, an outlet for directing the beam of light into the eye of an operator and a redirection diffractive optical element for creating a virtual image from the beam of light on the retina of the eye, the beam of light being directed from the inlet, along a path through the planar imager to the outlet, with the redirection diffractive optical element being positioned in the path, and the path from the inlet to the outlet providing angular magnification; and
   electronic means coupled to the modulating means and the deflection means for controlling the modulating means and the deflection means to, write an image only on the retina of the eye of the operator, whereby the deflecting in two orthogonal directions required to write an image on the retina of the eye is substantially reduced because of the angular magnification in the planar imager.

3. A direct retinal scan display as claimed in claim 2 wherein the planar imager includes an elongated optical waveguide with a plurality of reflection areas positioned between the inlet and outlet for extending the path of the beam of light and providing angular magnification.

4. A direct retinal scan display as claimed in claim 2 wherein the light source includes a laser.

5. A direct retinal scan display as claimed in claim 3 wherein the laser power entering the eye is no stronger than approximately 20 microwatts.

6. A direct retinal scan display as claimed in claim 2 including in addition mounting means for positioning the display on the head of an operator.

7. A direct retinal scan display as claimed in claim 6 wherein the mounting means includes eye glass frames.

8. A direct retinal scan display as claimed in claim 2 wherein the light source further includes means for producing a collimated beam of light.

9. A direct retinal scan display as claimed in claim 2 wherein the deflection means includes an acousto-optic scanner.

10. A direct retinal scan display as claimed in claim 2 wherein the modulating means includes an acousto-optic modulator.

11. A direct retinal scan display as claimed in claim 2 wherein the redirection diffractive optical element of the planar imager is constructed to converge the deflected beam of light at a convergence point within the eye substantially at an axis of rotation of the eye.

12. A method of forming a direct retinal scan display comprising the steps of:
   providing a directed beam of light modulated to impress video information onto the beam of light;
   deflecting the modulated beam of light in two orthogonal directions;
   providing a planar imager including an inlet for receiving a beam of light, an outlet for directing the received beam of light into the eye of an operator and a redirection diffractive optical element for creating a virtual image from the received beam of light on the retina of the eye, the received beam of light being directed from the inlet, along a path through the planar imager to the outlet, with the redirection diffractive optical element being positioned in the path, and the path from the inlet to the outlet providing angular magnification; and
   directing the modulated beam of light scanned in two orthogonal directions into the inlet of the planar imager, along the path through the planar imager and from the outlet of the planar imager into the eye of an operator, the modulated beam of light scanned in two orthogonal directions writing an image only on the retina of the eye of the operator, whereby the deflecting in two orthogonal directions required to write an image on the retina of the eye is substantially reduced because of the angular magnification in the planar imager.

13. A method of forming a direct retinal scan display as claimed in claim 12 wherein the step of providing a directed beam of light includes providing a collimated directed beam of light.

14. A method of forming a direct retinal scan display as claimed in claim 12 wherein the step of directing the beam of light into the eye of an operator includes converging the deflected beam of light at a convergence point within the eye substantially at an axis of rotation of the eye.

* * * * *